C. DARLING.
Car-Track Clearer.
No. 8,996.
Patented June 8, 1852.
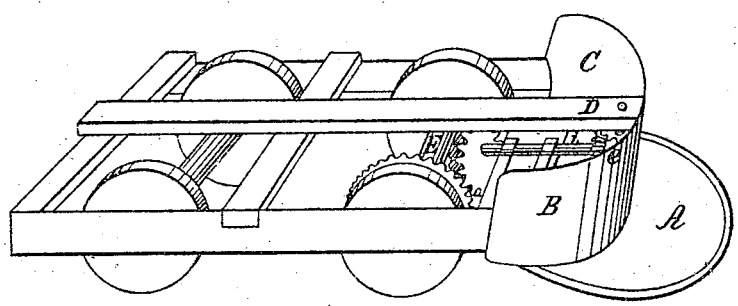

UNITED STATES PATENT OFFICE.

COOK DARLING, OF UTICA, NEW YORK.

COW-CATCHER.

Specification of Letters Patent No. 8,996, dated June 8, 1852.

*To all whom it may concern:*

Be it known that I, COOK DARLING, of Utica, in the county of Oneida, in the State of New York, have invented a new and useful cow-catcher or mode of clearing the track on railroads by a fixture in front of the locomotive-engine; and I do hereby declare that the following is a full, clear, and exact description of the construction and operation of the same, reference being had to the annexed drawings, and the letters and figures marked thereon, making a part of this specification.

Figure 1, is a four wheeled truck designed to represent the carriage on which the locomotive is placed, and the arrangement of which my invention consists, occupies the usual and necessary position in front of the carriage as shown in the figure. It consists of the circular plate wheel A, and the arched guard B, C, the former being movable, and the latter stationary. The wheel A, is fixed to an upright shaft $e$, and is large enough in its diameter to sweep over both rails, and is so elevated as to run near to them. It is wholly made of sheet metal, or an iron frame may be cast and then covered with a flooring of sheet iron or of planks. In either case its outer edge has a small bevel on the upper side, to favor the sliding up upon its surface of any obstacle which it may encounter. Its perpendicular shaft has a bearing for its upper end, in a cross bar at D, and passing through another bearing box below, has here a suitable collar upon it, which rests in the usual manner upon the upper side of this bearing box, to sustain it. The wheel A, is suspended on the lower end of the shaft, and is secured by a nut and screw, or otherwise, on the under side. The guard B, C, is lapped around in front of the carriage, forming the arc of a circle, presenting its convex side forward, and extending on each side a little beyond the diameter of the wheel A. Its width is about two feet, less or more, and is so located as to allow the wheel A, to turn under it. The most suitable material for this guard is strong sheet iron, and it is firmly fixed to the front of the carriage frame. Motion is communicated to the wheel A, from the wheel shaft E, of the carriage by the means of ordinary bevel gearing as shown in the drawing. The horizontal shaft $i$, has a center wheel on each end thereof, coupling with a like wheel on the shaft E, and another on the upright shaft of the wheel A, so that when the locomotive is in motion, the wheel A, is turned rapidly, just clearing the rails of the track in front. If any obstacle is encountered on the track, the circular motion of the wheel A, causes it to be thrown sidewise off the track. If the object falls upon the surface A, of the wheel, it is instantly brought against the arch of the guard B, C, and is inevitably dislodged outside of the track. If an object gets partly or wholly under the wheel A, the circular motion of the wheel, tends to throw it laterally off the tread more readily than if pressed directly forward by stationary guards or guards having only a direct forward motion.

What I claim as my invention and desire to secure by Letters Patent, is—

The wheel A, and the guard B, C, connected and arranged substantially as herein described, and for the purposes described.

COOK DARLING.

Witnesses:
 WILLIAM BAKER,
 RUFUS C. BAKER.